US008959872B2

(12) United States Patent
Ayres et al.

(10) Patent No.: US 8,959,872 B2
(45) Date of Patent: Feb. 24, 2015

(54) SYSTEMS, METHODS, AND COMPONENTS FOR THE CONSTRUCTION AND DISASSEMBLY OF RAISED PANEL ASSEMBLIES

(71) Applicant: The Boeing Company, Seal Beach, CA (US)

(72) Inventors: Stephen William Ayres, Mukilteo, WA (US); Ralph David Druckman, Lake Stevens, WA (US); Paul Henry Allen, Redmond, WA (US); Scott Allen Ziemann, Snohomish, WA (US); Michael C. Esposito, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/930,442

(22) Filed: Jun. 28, 2013

(65) Prior Publication Data

US 2014/0196831 A1 Jul. 17, 2014

Related U.S. Application Data

(63) Continuation-in-part of application No. 13/350,610, filed on Jan. 13, 2012, now Pat. No. 8,499,515.

(51) Int. Cl.
*E04B 1/68* (2006.01)
*E04F 15/14* (2006.01)
(Continued)

(52) U.S. Cl.
CPC ............... *B29D 99/001* (2013.01); *B64C 1/18* (2013.01)
USPC .......................... 52/741.4; 52/396.04; 52/464

(58) Field of Classification Search
USPC .......... 52/578, 582.1, 220.1, 220.8, 263, 393, 52/394, 395, 396.02, 396.04, 402, 461, 52/463, 464, 468, 741.4
See application file for complete search history.

(56) References Cited

U.S. PATENT DOCUMENTS 3,827,204 A * 8/1974 Walters ....................... 52/396.04
3,872,204 A * 3/1975 Yano et al. .................... 264/102
(Continued)

OTHER PUBLICATIONS

Screen Capture from Lowe's website, http://www.lowes.com/pd_303148-286-6917_?PL=1&productId=3087203, downloaded Nov. 16, 2011.
(Continued)

*Primary Examiner* — Elizabeth A Plummer
*Assistant Examiner* — Kyle Walraed-Sullivan
(74) *Attorney, Agent, or Firm* — DASCENZO Intellectual Property Law, P.C.

(57) ABSTRACT

Systems, methods, and components for the construction and disassembly of raised panel assemblies. These systems, methods, and components may include a flow-limiting structure that is configured to define at least one boundary of a channel that includes at least a portion of a gap between adjacent raised panels and is configured to receive a sealant material. The flow-limiting structure may limit a flow of the sealant material therepast, thereby decreasing an overall volume of sealant material needed for construction of the raised panel assembly and/or limiting undesired adhesion of the raised panels to other structures. These systems, methods, and components also may include an elongate disassembly aid that is configured to sever at least a portion of the sealant material from between adjacent raised panels upon removal from the raised panel assembly, such as to decrease a time needed for disassembly and/or repair of the raised panel assembly.

12 Claims, 6 Drawing Sheets

(51) Int. Cl.
*B29D 99/00* (2010.01)
*B64C 1/18* (2006.01)

(56) References Cited

U.S. PATENT DOCUMENTS

| | | | | |
|---|---|---|---|---|
| 4,622,794 | A * | 11/1986 | Geortner | 52/396.05 |
| 4,761,927 | A * | 8/1988 | O'Keeffe et al. | 52/396.06 |
| 4,784,516 | A * | 11/1988 | Cox | 404/69 |
| 4,817,963 | A * | 4/1989 | Munden et al. | 277/316 |
| 4,933,032 | A * | 6/1990 | Kunert | 156/108 |
| 5,211,506 | A * | 5/1993 | Manion | 404/87 |
| 6,747,068 | B2 | 6/2004 | Kelly et al. | |
| 6,993,874 | B2 * | 2/2006 | Trout | 52/393 |
| 2002/0194807 | A1 * | 12/2002 | Nelson et al. | 52/582.1 |
| 2006/0038071 | A1 * | 2/2006 | Schoene | 244/118.6 |
| 2006/0117692 | A1 * | 6/2006 | Trout | 52/393 |
| 2007/0151185 | A1 * | 7/2007 | Robinson | 52/396.04 |
| 2012/0023846 | A1 * | 2/2012 | Mattox et al. | 52/232 |

OTHER PUBLICATIONS

Screen Capture from Amazon website, http://www.amazon.com/M-D-Building-Products-71464-Backer/dp/B000BQS90G/ref=sr_1_1?ie=UTF8&qid=1325014265&sr=8-1, downloaded Jan. 13, 2012.
Screen Capture from RHD Japan website, http://www.rhdjapan.com/nissan-oem-sealant-dam-rubber-89901-s15-63587, downloaded Nov. 16, 2011.
Screen Capture from TopFreeBiz website, http://www.topfreebiz.com/product/3858760/Rubber-Water-Stop-Water-Sealant-Sealant-Tape.htm, downloaded Jan. 13, 2012.
Screen Capture from InspectAPedia website, http://www.inspectapedia.com/BestPractices/Best_Kitchen_Bath12.htm, downloaded Nov. 16, 2011.
Standard Flooring Details Guide from FlorLine Group.

* cited by examiner

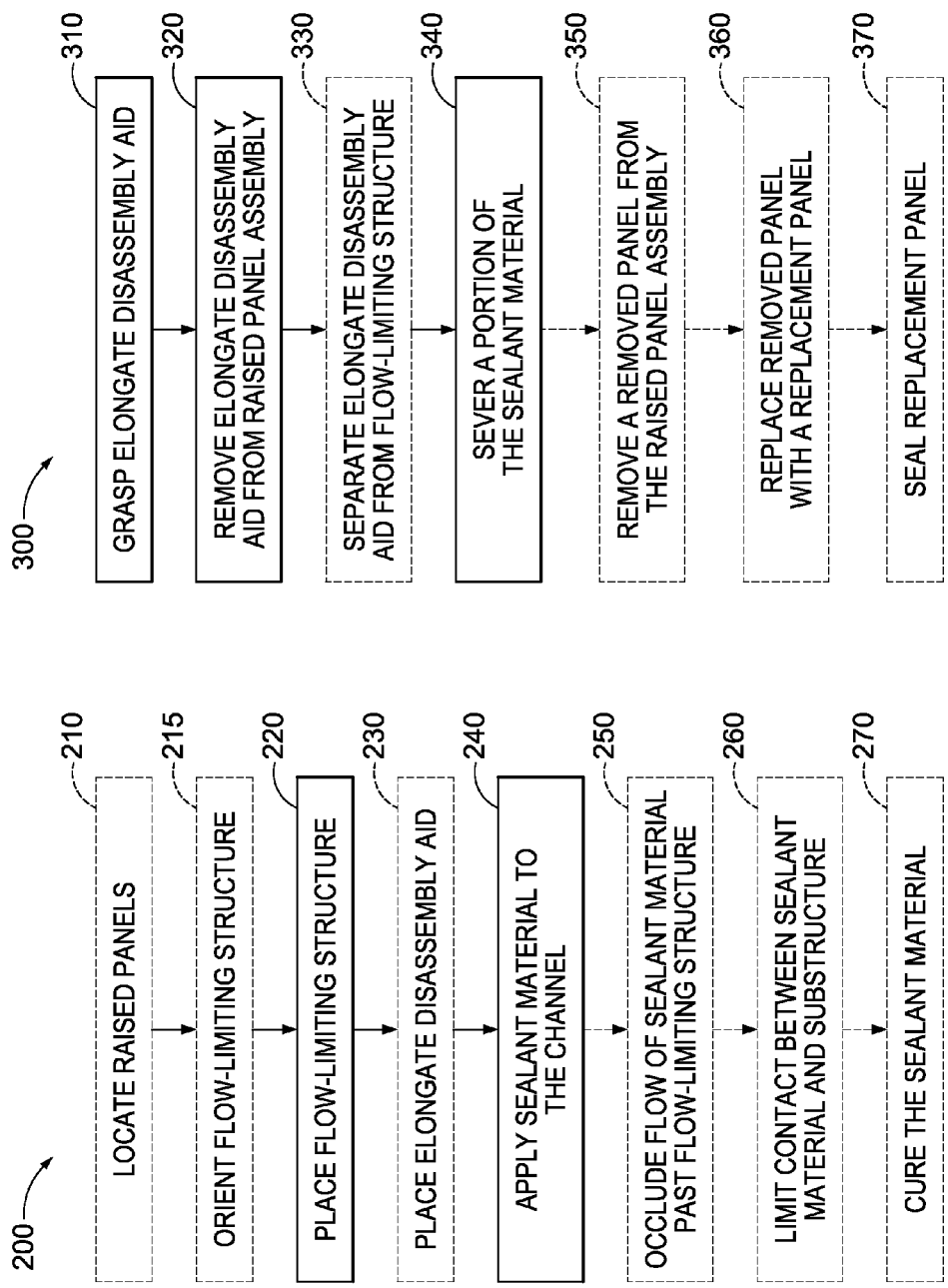

SYSTEMS, METHODS, AND COMPONENTS FOR THE CONSTRUCTION AND DISASSEMBLY OF RAISED PANEL ASSEMBLIES

FIELD

The present disclosure is directed generally to raised panel assemblies and components thereof, and more specifically to systems, methods, and components for the construction and/or disassembly of raised panel assemblies.

BACKGROUND

Raised panel assemblies may be constructed and/or utilized in a variety of structures to form a raised surface. In general, raised panel assemblies include a plurality of raised panels, at least a portion of which may include and/or be operatively attached to a substructure. The substructure may be configured to support, retain, and/or otherwise locate each of the plurality of raised panels with respect to the other of the plurality of raised panels and/or with respect to the substructure. The raised panels may include a supported portion, which may be in direct physical contact with the substructure, as well as an unsupported portion, which may not be in direct physical contact with the substructure.

Some raised panel assemblies may include a gap between adjacent raised panels thereof, and this gap may be filled with a sealant material that may be configured to adhere the first raised panel to the second raised panel and/or to serve as a barrier to transport of a fluid and/or a solid material therethrough. As an illustrative, non-exclusive example, an aircraft may include a floor that is constructed from a raised panel assembly, and the gaps between adjacent raised panels may be filled with the sealant material to produce sealed gaps.

When constructing a raised panel assembly that includes sealed gaps, sealant material may flow out of the gaps during the construction process. This may increase the amount of sealant material that is required to seal the raised panel assembly, increase sealant material costs, increase the overall weight of the raised panel assembly, and/or increase the environmental impacts associated with cleanup and/or disposal of excess sealant material. Similarly, when disassembling a raised panel assembly that includes sealed gaps, it may be difficult to remove the sealant material from between adjacent raised panels and/or sealant, which may have flowed out from the gaps in the raised panel assembly, may bond the raised panels directly to the substructure, making it difficult or impossible to remove the raised panels from the raised panel assembly without damage to the raised panels and/or to the substructure. Thus, there exists a need for improved systems and methods for constructing and/or disassembling raised panel assemblies.

SUMMARY

Systems, methods, and components for the construction and disassembly of raised panel assemblies are disclosed herein. These systems, methods, and components may include a flow-limiting structure that is configured to define at least one boundary of a channel that includes at least a portion of a gap between adjacent raised panels and is configured to receive a sealant material. The flow-limiting structure may limit a flow of the sealant material therepast, thereby decreasing an overall volume of sealant material that may be needed for construction of the raised panel assembly and/or limiting undesired adhesion of raised panels that are associated with the raised panel assembly to other structures, such as a substructure that is configured to support the raised panel assembly. These systems, methods, and components also may include an elongate disassembly aid that is configured to sever at least a portion of the sealant material from between adjacent raised panels upon removal from the raised panel assembly. Accordingly, use of the elongate disassembly aid may decrease a time for disassembly and/or repair of the raised panel assembly.

In some embodiment, the methods may include constructing the raised panel assembly. In some embodiment, the constructing may include placing the flow-limiting structure within the raised panel assembly (or within the gap thereof) to form a channel and applying the sealant material to the channel. In some embodiments, the methods further may include placing the elongate disassembly aid within the gap. In some embodiments, the flow-limiting structure is placed within the gap as a solid. In some embodiments, the flow-limiting structure is compressed between the raised panels when placed within the raised panel assembly. In some embodiments, the placing the flow-limiting structure includes regulating a depth of the flow-limiting structure within the gap. In some embodiments, the placing the flow-limiting structure includes placing with an application tool. In some embodiments, the methods further include orienting the flow-limiting structure relative to the application tool.

In some embodiments, the methods also may include disassembling the raised panel assembly. In some embodiments, the disassembling may include grasping the elongate disassembly aid, removing the elongate disassembly aid from the raised panel assembly and severing at least a portion of the sealant material that extends between the raised panels during the removing. In some embodiments, the removing the elongate disassembly aid further includes separating the elongate disassembly aid from the flow-limiting structure. In some embodiments, the disassembling further may include removing one or more raised panels from the raised panel assembly.

In some embodiments, the flow-limiting structure, or a resilient elongate body thereof, defines a longitudinal axis and includes a central portion and two projections that extend from opposed side regions of the central portion. In some embodiments, the central portion and the two projections extend along the longitudinal axis. In some embodiments, the resilient elongate body is a monolithic resilient elongate body that defines a substantially constant transverse cross-sectional shape. In some embodiments, the two projections extend from the central portion to define a concave recessed region that is configured to receive a convex region of the application tool. In some embodiments, the systems include a kit of components that includes the flow-limiting structure, the sealant material, and the application tool.

BRIEF DESCRIPTION OF THE DRAWINGS

FIG. 11 is a flowchart depicting illustrative, non-exclusive examples of methods of constructing a raised panel assembly according to the present disclosure.

FIG. 12 is a flowchart depicting illustrative, non-exclusive examples of methods of disassembling a raised panel assembly according to the present disclosure.

DESCRIPTION

Figure 1:
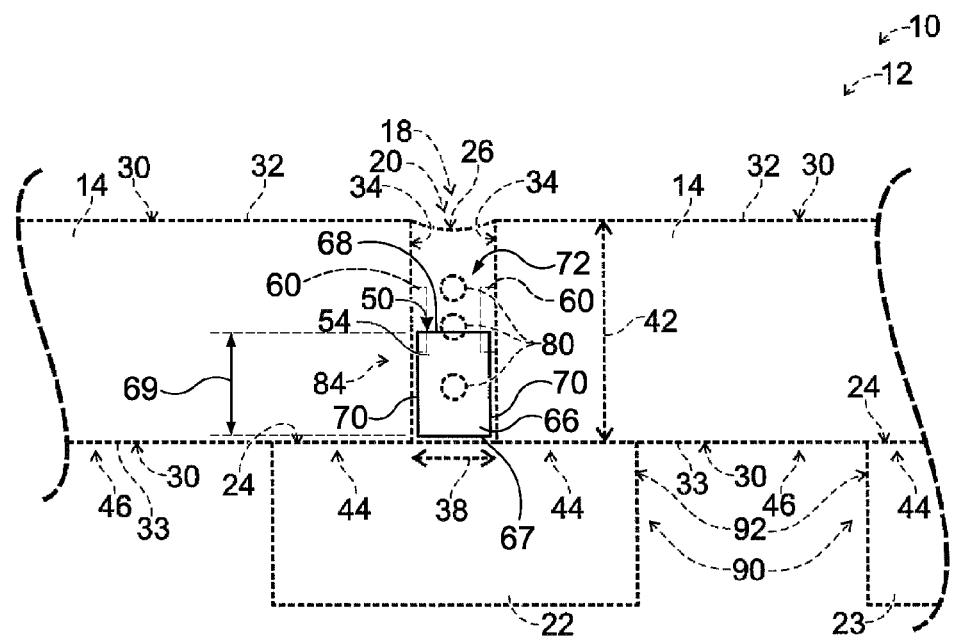
FIG. 1 is a schematic cross-sectional view of an illustrative, non-exclusive example of a flow-limiting structure according to the present disclosure.

FIGS. 1-10 provide illustrative, non-exclusive examples of flow-limiting structures 50 according to the present disclosure, as well as structures 10 and/or raised panel assemblies 12 that may include and/or utilize the flow-limiting structures. Elements that serve a similar, or at least substantially similar, purpose are labeled with like numbers in each of FIGS. 1-10; and these elements may not be discussed in detail herein with reference to each of FIGS. 1-10. Similarly, all elements may not be labeled in each of FIGS. 1-10, but the reference numerals associated therewith may still be utilized herein for consistency. In general, elements that are likely to be included in a given embodiment are shown in solid lines, while elements that are optional are shown in dashed lines. However, elements that are shown in solid lines are not essential to all embodiments, and it is within the scope of the present disclosure that an element shown in solid lines may be omitted from a particular embodiment.

FIG. 1 is a schematic cross-sectional view of an illustrative, non-exclusive example of a flow-limiting structure 50 according to the present disclosure. Flow-limiting structure 50 may be included in, utilized to construct, and/or form a portion of any suitable raised panel assembly 12, which may form a portion of any suitable structure 10. Raised panel assembly 12 may include a plurality of raised panels 14, each of which may include two substantially opposed surfaces 30, such as first opposed surface 32, which also may be referred to herein as top surface 32 and/or upper surface 32, and second opposed surface 33, which also may be referred to herein as bottom surface 33 and/or lower surface 33, and one or more edges 34. In raised panel assembly 12, a first edge that is associated with a first raised panel may be proximal to, adjacent to, near to, and/or opposed to and spaced apart from a second edge that is associated with a second raised panel to produce a gap 18, which also may be referred to herein as an opening, trench, and/or space, between two raised panels 14.

When flow-limiting structure 50 is included in raised panel assembly 12, flow-limiting structure 50 may be in any suitable mechanical (physical) communication with raised panels 14 and may form at least one surface and/or boundary of a channel, trough, and/or trench 20 that is configured to receive, bound, and/or contain a sealant material 26, as schematically shown in FIG. 1. As illustrative, non-exclusive examples, and as shown in more detail in FIGS. 2-4 and 8-10, flow-limiting structure 50 may be present within gap 18 between adjacent raised panels 14. As another illustrative, non-exclusive example, and as shown in more detail in FIGS. 5-6, flow-limiting structure 50 may be operatively attached to and/or in mechanical communication with lower surface 33 of raised panels 14 and/or may form a boundary of gap 18.

It is further within the scope of the present disclosure that flow-limiting structure 50 may be operatively attached to and/or in mechanical communication with lower surface 33 of raised panels 14 and that it also may extend within gap 18 between adjacent raised panels 14. Sealant material 26 and/or flow-limiting structure 50 may include, contain, surround, enclose, be adhered to, be adjacent to, be proximal to, and/or be in mechanical communication with an elongate disassembly aid 80, which may be configured to simplify, improve, decrease a time for, and/or otherwise facilitate disassembly of the raised panel assembly and/or separation of the adjacent raised panels.

One or more substructure(s) 22, 23, which also may be referred to herein as support structure(s) 22, 23, may support a supported portion, or region, 44 of raised panels 14, while an unsupported portion, or region, 46 of raised panels 14 may not be supported, or may not be directly supported, by substructure(s) 22, 23. Both supported portion 44 and unsupported portion 46 may be present on the same side, or surface, of the raised panels. Substructures 22, 23 may be configured to support and/or be in mechanical communication with any suitable portion of a surface area of raised panels 14. As illustrative, non-exclusive examples, the unsupported portion may include at least 25%, at least 50%, at least 60%, at least 65%, at least 70%, at least 75%, at least 80%, at least 85%, at least 90%, at least 95%, 50-95%, 70-95%, or 75-90% of the surface area of the raised panels.

Construction of raised panel assembly 12 using both flow-limiting structure 50 and sealant material 26 may decrease a flow of sealant material 26 out of gap 18 and/or trench 20 during application of sealant material 26 to trench 20 and also may decrease a volume and/or mass of sealant material 26 that may be needed to fill gap 18 and/or trench 20. This may decrease a volume of sealant material 26 that may be utilized to adhere adjacent raised panels 14 together relative to a comparable raised panel assembly that does not include flow-limiting structure 50. Additionally or alternatively, this may decrease an overall weight of the raised panel assembly 12 relative to the comparable raised panel assembly. As illustrative, non-exclusive examples, the volume of sealant material may be 10%, 20%, 25%, 30%, 40%, 50%, 60%, 70%, or 75% less than the volume of sealant material that may be utilized in the comparable raised panel assembly.

In addition, the presence of flow-limiting structure 50 may decrease, limit, preclude, and/or stop the formation of an adhesive bond between sealant material 26 and substructure 22 and/or between raised panels 14 and substructure 22, which may speed and/or simplify disassembly of raised panel assembly 12. Similarly, the inclusion of elongate disassembly aid 80 within raised panel assembly 12 may speed and/or simplify disassembly of the raised panel assembly and/or separation of a first raised panel from a second, adjacent, raised panel by severing at least a portion of sealant material 26 from between adjacent raised panels 14 when elongate disassembly aid 80 is removed from raised panel assembly 12.

The use of elongate disassembly aid 80 to sever sealant material 26 may decrease a potential for damage to raised panel assembly 12 during disassembly thereof when compared to other disassembly methods, such as those that may utilize a knife to sever the sealant material. In addition, the use of flow-limiting structure 50 and/or elongate disassembly aid 80 may facilitate removal of a portion of raised panels 14 that may be present within raised panel assembly 12 without damage to sealant material 26 that is present between the remainder of the raised panels that are present within raised panel assembly 12.

As discussed in more detail herein, flow-limiting structure 50, sealant material 26, and/or elongate disassembly aid 80 may include, be coated with, and/or be constructed from one or more hydrophobic materials 84. The use of these hydrophobic materials may decrease a potential for corrosion of the components of structure 10 and/or raised panel assembly 12 upon exposure to moisture.

Flow-limiting structure 50 may include any suitable structure that is configured to be placed within gap 18, to form a boundary of trench 20, and/or to decrease, limit, occlude, and/or stop a flow of sealant material 26 therepast. As an illustrative, non-exclusive example, flow-limiting structure 50 may include a resilient elongate body 54 that is configured to be compressed between adjacent raised panels 14. As perhaps shown most clearly in FIG. 2, resilient elongate body 54 may include a longitudinal axis 51 that may be aligned with, parallel to, at least substantially parallel to, and/or coextensive with a longitudinal axis 21 of gap 18.

Resilient elongate body 54 may include, be manufactured from, and/or be formed from any suitable structure and/or material. As illustrative, non-exclusive examples, the resilient elongate body may include any suitable resilient solid, elastomer, polymer, hydrophobic material, foam, hydrophobic foam, polyurethane form, and/or hydrophobic polyurethane foam.

Figure 2:
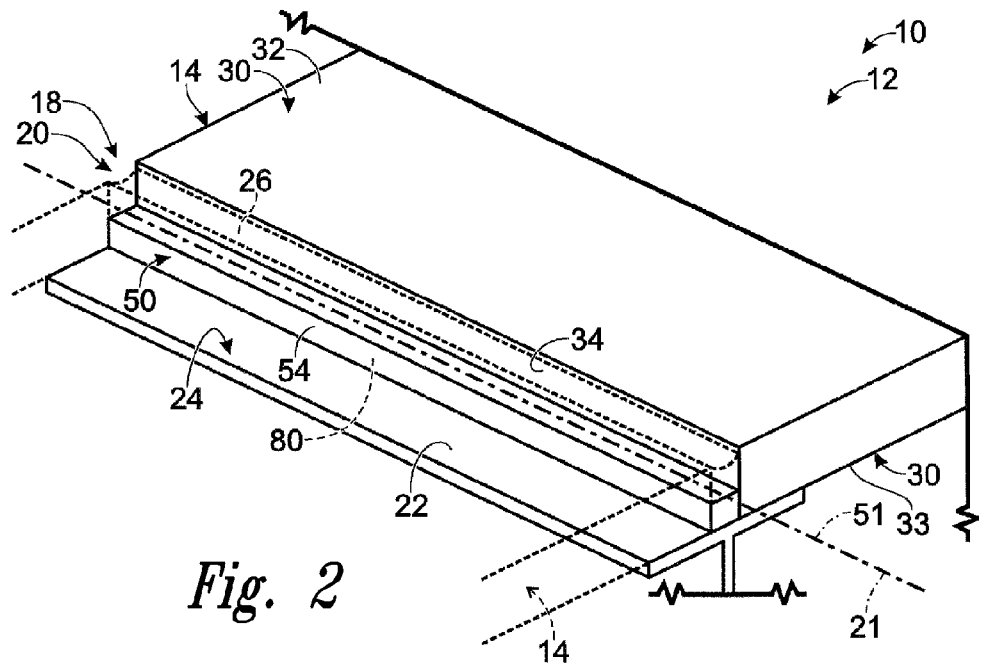
FIG. 2 is an oblique projection of a less schematic but still illustrative, non-exclusive example of a raised panel assembly that includes a flow-limiting structure according to the present disclosure.

While FIG. 1 illustrates flow-limiting structure 50, and/or resilient elongate body 54 thereof, as including a rectangular cross-sectional, or transverse cross-sectional, shape, flow-limiting structure 50 may include any suitable transverse cross-sectional shape. As illustrative, non-exclusive examples, flow-limiting structure 50 may include a circular, oval, ellipsoidal, trapezoidal, polygonal, square, and/or rectangular cross-sectional shape. Additionally or alternatively, and as discussed in more detail herein with reference to FIGS. 7-10, resilient elongate body 54 also may be a monolithic resilient elongate body and/or may define a central portion 66 and two projections 60 that extend from the central portion. When resilient elongate body 54 includes central portion 66 and projections 60, the central portion and/or the projections may extend along longitudinal axis 51 (as illustrated in FIG. 2).

As illustrated in FIG. 1, central portion 66 may define a first face 67 and a second face 68 that is opposed to the first face, and a distance between the first face and the second face may define a central portion thickness (or average thickness) 69. As also illustrated in FIG. 1 projections 66 may extend from opposed sides, opposed regions, and/or opposed side regions of central portion 66. As an illustrative, non-exclusive example, projections 66 may extend from respective edges 70 of central portion 66, and these edges may be defined between first face 67 and second face 68. Additionally or alternatively, projections 66 also may extend from first face 67 and/or from second face 68. When resilient elongate body 54 includes projections 60, the projections may extend from central portion 66 to define a recessed region 72 therebetween. It is within the scope of the present disclosure that recessed region 72 may define any suitable shape and/or transverse cross-sectional shape. As illustrative, non-exclusive examples, recessed region 72 may define, or be, a concave region, a generally V-shaped region, a generally U-shaped region, a generally cup-shaped region, and/or a generally trough-shaped region. When resilient elongate body 54 is located within raised panel assembly 12, recessed region 72 may be configured to receive and/or contain sealant material 26.

It is within the scope of the present disclosure that flow-limiting structure 50 and/or the resilient elongate body 54 thereof may be configured to be placed within raised panel assembly 12, and/or within gap 18 thereof, in a solid, or at least substantially solid, form and that flow-limiting structure 50 may include and/or be a resilient and/or a non-resilient solid. When flow-limiting structure 50 is placed within raised panel assembly 12 as a solid, the flow-limiting structure may be compressed between adjacent raised panels 14 and/or between one or more raised panels 14 and substructures 22, 23. As an illustrative, non-exclusive example, flow-limiting structure 50 may include an uncompressed characteristic cross-sectional diameter, or dimension, when in an uncompressed state and a compressed characteristic cross-sectional diameter, or dimension, when in a compressed state. The compressed characteristic cross-sectional diameter may be and/or correspond to a width 38 of gap 18 and may be less than the uncompressed characteristic cross-sectional diameter by, or by at least, a threshold compression fraction, or percentage. Illustrative, non-exclusive examples of threshold compression percentages according to the present disclosure include threshold compression percentages of at least 5%, at least 10%, at least 15%, at least 20%, at least 25%, at least 30%, at least 35%, at least 40%, at least 45%, at least 50%, 5-25%, or 5-50%.

Elongate disassembly aid 80 may include any suitable structure that may be configured to slice, cut, sever, tear, and/or split at least a portion of sealant material 26 from between adjacent raised panels 14 upon removal from raised panel assembly 12 and/or during disassembly of the raised panel assembly. Elongate disassembly aid 80 may include a longitudinal axis that may be aligned with, parallel to, at least substantially parallel to, and/or coextensive with at least a portion, and optionally all, of the longitudinal axis of gap 18, flow-limiting structure 50, and/or resilient elongate body 54.

Elongate disassembly aid 80 may include any suitable structure and/or shape and may be manufactured and/or formed from any suitable material. As illustrative, non-exclusive examples, elongate disassembly aid 80 may include any suitable string, thread, filament, wire, rod, and/or cable. As another illustrative, non-exclusive example, elongate disassembly aid 80 may be manufactured from any suitable metal, polymer, elastomer, nylon, polyester, polyethylene, polypropylene, and/or hydrophobic material.

Generally, elongate disassembly aid 80 will include a different composition than the composition of resilient elongate body 54 and/or sealant material 26. As illustrative, non-exclusive examples, elongate disassembly aid 80 may include a different chemical composition, a different density, a different Young's modulus, a different shear strength, and/or a different tensile strength than that of resilient elongate body 54 and/or sealant material 26. As another illustrative, non-exclusive example, elongate disassembly aid 80 may include a greater shear strength and/or a greater tensile strength than that of resilient elongate body 54 and/or sealant material 26.

As shown in dashed lines in FIG. 1, elongate disassembly aid 80 may be present at any suitable location within gap 18. As illustrative, non-exclusive examples, elongate disassembly aid 80 may be located within and/or operatively attached to resilient elongate body 54. Under these conditions, elongate disassembly aid 80 may be configured to be separated from and/or modify a structure of at least a portion of resilient elongate body 54 upon removal from raised panel assembly 12 and to slice, cut, sever, tear, and/or split at least a portion of resilient elongate body 54 upon separation therefrom. As an illustrative, non-exclusive example, elongate disassembly aid 80 may be configured to modify at least a portion of a length of resilient elongate body 54 upon separation therefrom. Illustrative, non-exclusive examples of the portion of the length of resilient elongate body 54 include at least 50%, at least 60%, at least 70%, at least 75%, at least 80%, at least 90%, at least 95%, at least 99%, 100%, 50-100%, 70-99%, or 75-100% of the length of the resilient elongate body.

As also shown in dashed lines in FIG. 1, elongate disassembly aid 80 may not be contained within and/or attached to resilient elongate body 54. As illustrative, non-exclusive examples, elongate disassembly aid 80 may be in mechanical communication with but not attached to resilient elongate body 54, may be adjacent to but not attached to the resilient elongate body, may be between sealant material 26 and the resilient elongate body, and/or may be located within and/or surrounded by the sealant material. When elongate disassembly aid 80 is not contained within and/or attached to resilient elongate body 54, it is within the scope of the present disclosure that the elongate disassembly aid may be removed from raised panel assembly 12 without damage to and/or modification of the resilient elongate body.

Sealant material 26 may include any suitable structure and/or material that may be placed within gap 18 and/or trench 20 and may be configured to form an adhesive bond between and/or with adjacent raised panels 14 and/or flow-limiting structure 50. As illustrative, non-exclusive examples, sealant material 26 may include any suitable adhesive, elastomer, polymer, resilient material, and/or hydrophobic material. It is within the scope of the present disclosure that sealant material 26 may be configured to be placed within and/or applied to gap 18 and/or trench 20 as a liquid sealant material and to be cured therein to form a solid, solid-like, or at least highly viscous sealant material.

Substructure(s) 22, 23 may be included in, form a portion of, provide mechanical support to, and/or be in mechanical communication with raised panel assembly 12. As discussed in more detail herein, it is within the scope of the present disclosure that at least a portion of raised panel assembly 12, and/or raised panels 14 thereof, may be operatively attached to substructure(s) 22, 23, such as through the use of retention structures 90. Illustrative, non-exclusive examples of retention structures 90 according to the present disclosure include any suitable fastener, screw, rivet, bolt, washer, nut, and/or nut clip.

As shown in FIG. 1, supported portion 44 of raised panels 14 may be in direct contact with a support surface 24 of substructure(s) 22, 23. However, it is also within the scope of the present disclosure that one or more support structures 92 may be present between substructure(s) 22, 23 and raised panels 14 and may separate at least a portion of the raised panels from the substructure(s) and/or produce a second gap therebetween. As also shown in FIG. 1, substructure 22 may be present below at least a portion of gap 18. Additionally or alternatively, substructure 23 may not be located below at least a portion of gap 18. When substructure 23 is not located below gap 18, the use of flow-limiting structure 50 may provide for the application of sealant material 26 to gap 18 without the use of a tape material (or an additional tape material) to cover a bottom surface of the gap and prevent flow of the sealant material therethrough.

Gap 18 may include any suitable width 38 and/or depth 42 and may extend between edges 34 of raised panels 14. Illustrative, non-exclusive examples of gap widths 38 according to the present disclosure include gap widths of less than 2 cm, less than 1.5 cm, less than 1 cm, less than 0.75 cm, less than 0.5 cm, less than 0.4 cm, less than 0.3 cm, less than 0.2 cm, less than 0.1 cm, 0.1-2 cm, 0.1-1 cm, or 0.2-0.8 cm. Illustrative, non-exclusive examples of gap depths 42 according to the present disclosure include gap depths of less than 2.5 cm, less than 2 cm, less than 1.5 cm, less than 1 cm, less than 0.75 cm, less than 0.5, or 0.5-2.5 cm. Gap depth 42 also may be referred to herein as raised panel thickness 42, which may be defined by upper surface 32 and lower surface 33 of raised panels 14.

As discussed in more detail herein, raised panel assembly 12, which also may be referred to herein as partially supported panel assemblies 12, floating panel assemblies 12, sealed panel assemblies 12, and/or sealed raised panel assemblies 12, may form a raised surface that may be included in and/or form a portion of any suitable structure 10. Illustrative, non-exclusive examples of raised surfaces according to the present disclosure include any suitable floor surface, wall surface, and/or ceiling surface. Illustrative, non-exclusive examples of structures 10 according to the present disclosure include any suitable building, aircraft, automobile, and/or machine.

FIG. 2 is an oblique projection of a less schematic but still illustrative, non-exclusive example of a raised panel assembly 12 that includes a flow-limiting structure 50 according to the present disclosure. As shown in FIG. 2 and discussed in more detail herein with reference to FIG. 1, raised panel assembly 12 may include one or more raised panels 14 (one of which is shown in dashed lines in FIG. 2), the adjacent edges of which may form gap 18. Raised panels 14 may be supported by substructure 22. Gap 18 may include flow-limiting structure 50, which may define a portion of channel 20. Channel 20 may include sealant material 26.

FIG. 2 illustrates that flow-limiting structure 50 and/or resilient elongate body 54 thereof includes a longitudinal axis 51 that is aligned with, parallel to, at least substantially parallel to, and/or coextensive with a longitudinal axis 21 of gap 18. FIG. 2 also illustrates that raised panels 14 each include two substantially opposed surfaces 30 and one or more edges 34, wherein the space between edges 34 of adjacent raised panels 14 may form and/or define at least a portion of gap 18 and/or trench 20.

Figure 3:
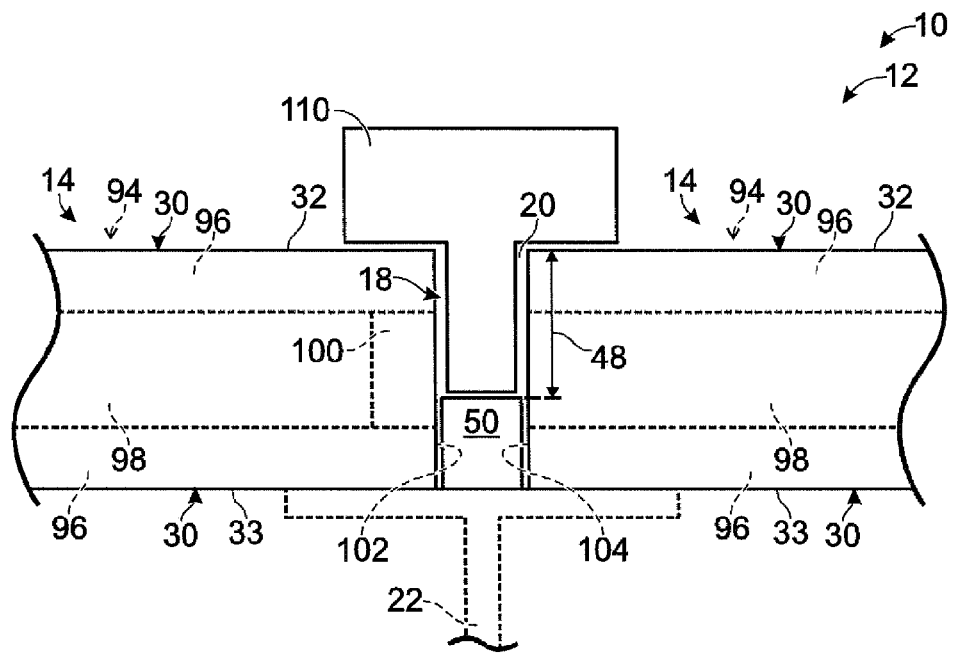
FIG. 3 is a schematic cross-sectional view of an illustrative, non-exclusive example of a flow-limiting structure being placed within a raised panel assembly using an application tool according to the present disclosure.

FIG. 3 is a schematic cross-sectional view of an illustrative, non-exclusive example of a flow-limiting structure 50 being placed within a raised panel assembly 12 using an application tool 110 according to the present disclosure. Application tool 110 may be configured to place, insert, and/or otherwise locate flow-limiting structure 50 at a desired depth 48 within gap 18 to produce and/or define trench 20. Desired depth 48 may include any suitable depth for flow-limiting structure 50. As an illustrative, non-exclusive example, and when substructure 22 is located beneath gap 18, application tool 110 may insert flow-limiting structure 50 into gap 18 such that the flow-limiting structure is proximal to and/or in mechanical communication with substructure 22. As another illustrative, non-exclusive example, application tool 110 may insert flow-limiting structure 50 to a depth that is sufficient to provide for a target, or desired, contact area between sealant material 26 and raised panels 14, such as to provide for a desired bond strength therebetween. As yet another illustrative, non-exclusive example, and when substructure 22 is not located beneath gap 18, application tool 110 may insert flow-limiting structure 50 into gap 18 such that it is retained between adjacent raised panels 14 due to compression of the flow-limiting structure therebetween.

FIG. 3 also illustrates that raised panels 14 may be constructed using any suitable method and/or materials. As an illustrative, non-exclusive example, raised panels 14 may include and/or be composite raised panels 94. Composite raised panels 94 may include two or more surface material panels 96 that define raised panel surfaces 30, as well as a core material panel 98 that is contained between the two or more surface material panels. Composite panels 94 may include a potting material 100 that defines a potted edge 102 of the composite panel. Additionally or alternatively, composite panels 94 also may include an unpotted edge 104 that includes exposed core material panel 98 and does not include the potting material.

Figure 4:
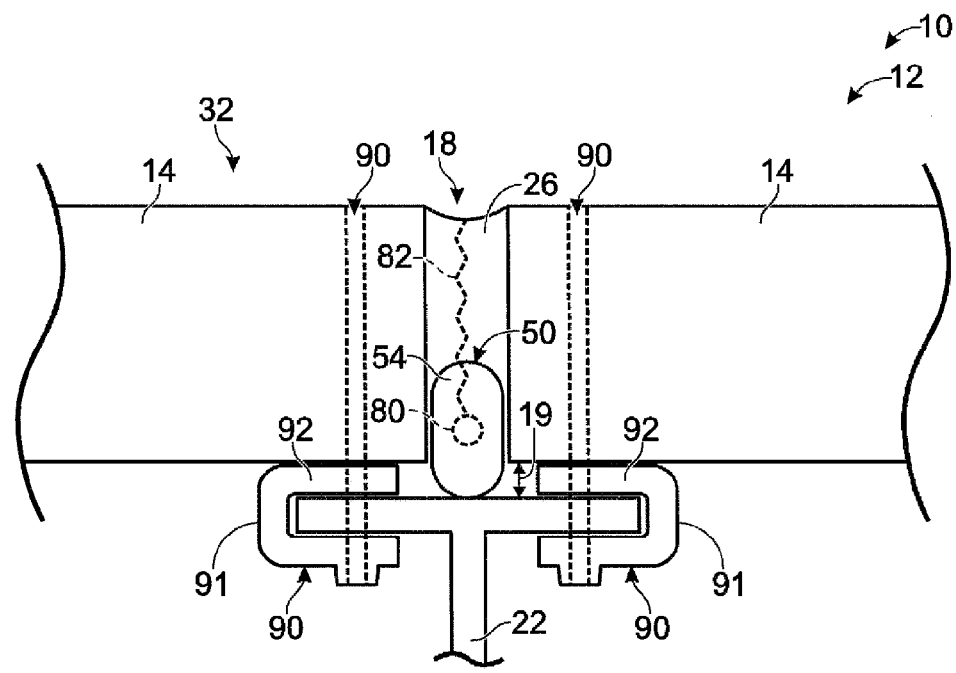
FIG. 4 is a cross-sectional view of a less schematic but still illustrative, non-exclusive example of a raised panel assembly according to the present disclosure.

FIG. 4 is a cross-sectional view of a less schematic but still illustrative, non-exclusive example of a raised panel assembly 12 according to the present disclosure. The raised panel assembly of FIG. 4 is substantially similar to the raised panel assembly of FIGS. 1-3 but provides less schematic examples of retention structure 90, support structure 92, flow-limiting structure 50, and/or substructure 22.

As shown in FIG. 4 and discussed in more detail herein, retention structure 90 may include a plurality of nut clips 91, each of which may include a support structure 92 that may separate substructure 22 from raised panels 14. Nut clips 91 may be spaced apart along a length of substructure 22, producing a second gap 19 between substructure 22 and raised panels 14; and flow-limiting structure 50 may limit, block, occlude, and/or stop a flow of sealant material 26 into second gap 19, decreasing a potential for the formation of an adhesive bond between substructure 22 and raised panels 14.

As also shown in FIG. 4, elongate disassembly aid 80 may be present within raised panel assembly 12 and/or within flow-limiting structure 50 thereof. As discussed in more detail herein, elongate disassembly aid 80 may be removed from raised panel assembly 12 by drawing the elongate disassembly aid through flow-limiting structure 50 and sealant material 26 and from upper surface 32 of raised panel assembly 12. Removal of elongate disassembly aid 80 from raised panel assembly 12 may slice, cut, sever, tear, and/or split flow-limiting structure 50 and/or sealant material 26, producing a damaged region 82, which may simplify removal of one or more raised panels 14 from raised panel assembly 12.

While FIG. 4 illustrates that all of sealant material 26 that extends between raised panels 14 may be severed upon removal of elongate disassembly aid 80 from raised panel assembly 12, it is within the scope of the present disclosure that any suitable severed portion of the sealant material and/or flow-limiting structure 50 may be severed. Illustrative, non-exclusive examples of the severed portion according to the present disclosure include at least 50%, at least 60%, at least 70%, at least 80%, at least 90%, at least 99%, or 100% of sealant material 26 and/or the flow-limiting structure 50 that extends between the raised panels.

Figure 5:
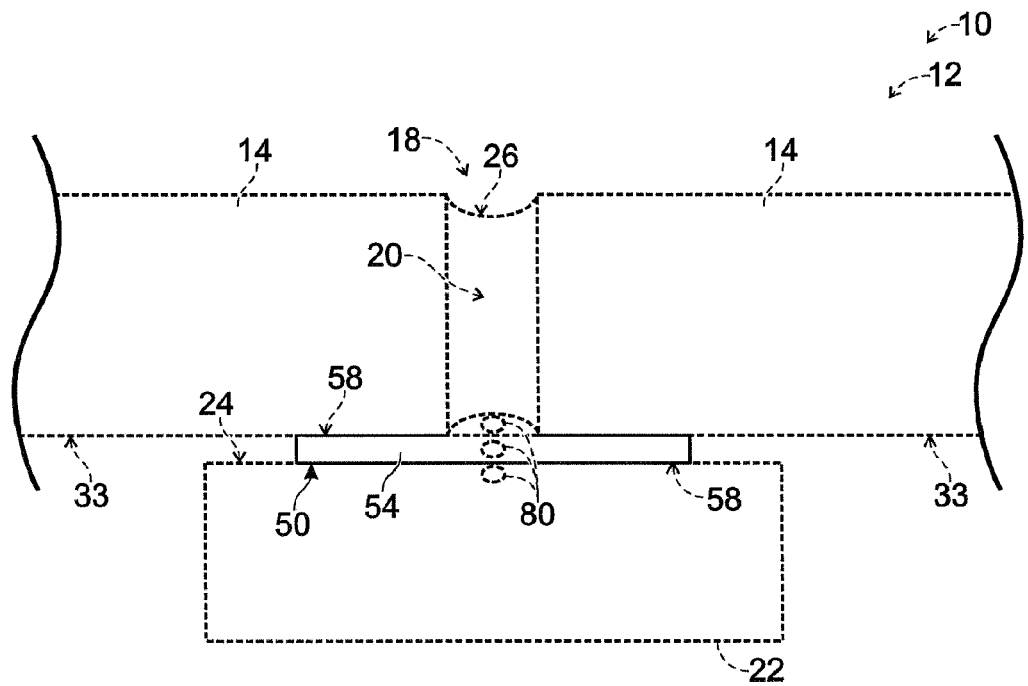
FIG. 5 is another schematic cross-sectional view of an illustrative, non-exclusive example of a flow-limiting structure according to the present disclosure.

FIG. 5 is another schematic cross-sectional view of an illustrative, non-exclusive example of a flow-limiting structure 50 according to the present disclosure. As discussed in more detail herein with reference to FIG. 1, the flow-limiting structure of FIG. 5 forms a lower boundary, edge, and/or surface of channel 20 and limits a flow of sealant material 26 therefrom. In FIG. 5, flow-limiting structure 50 may include a planar, or at least substantially planar, resilient elongate body 54, illustrative, non-exclusive examples of which include a tape, a strip or other length of foam or other material through which the sealant material does not flow, and/or a foam tape.

As discussed in more detail herein, when flow-limiting structure 50 is included in raised panel assembly 12, substructure 22 may be present below at least a portion of gap 18. Under these conditions, flow-limiting structure 50 may be placed on substructure 22 prior to assembly and/or placement of raised panels 14 thereupon. It is within the scope of the present disclosure that flow-limiting structure 50 may, additionally or alternatively, be operatively attached to a support surface 24 of substructure 22, such as through the use of an adhesive 58, fastener, and/or releasable fastener. As discussed in more detail herein, flow-limiting structure 50 may be compressed, such as between substructure 22 and raised panels 14, to prevent and/or occlude a flow of sealant material 26 therepast.

Additionally or alternatively, flow-limiting structure 50 may be operatively attached to lower surface 33 of raised panels 14, such as through the use of adhesive 58. As discussed in more detail herein, elongate disassembly aid 80 may be present within any suitable portion of gap 18 and/or flow-limiting structure 50 and may be configured to aid in disassembly of raised panel assembly 12.

Figure 6:
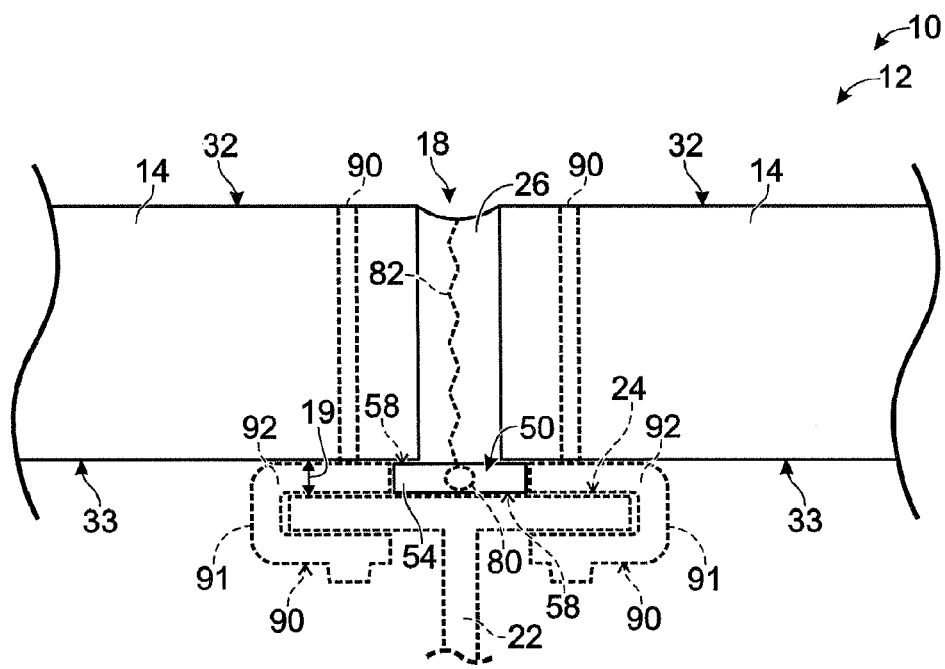
FIG. 6 is another cross-sectional view of a less schematic but still illustrative, non-exclusive example of a raised panel assembly according to the present disclosure.

FIG. 6 is another cross-sectional view of a less schematic but still illustrative, non-exclusive example of a raised panel assembly 12 according to the present disclosure. In the raised panel assembly of FIG. 6, flow-limiting structure 50 is in mechanical contact with lower surface 33 of raised panels 14 and limits a flow of sealant material 26 therepast.

As discussed in more detail herein with reference to FIGS. 4-5, substructure 22 may be present beneath gap 18 and operatively attached to raised panels 14 by any suitable mechanism, an illustrative, non-exclusive example of which includes retention structures 90, such as nut clips 91. Support structure 92 of nut clips 91 may create a second gap 19 between substructure 22 and raised panels 14, and flow-limiting structure 50 may limit a flow of sealant material 26 into the second gap.

It is within the scope of the present disclosure that, as shown in FIG. 4, second gap 19 may be bounded by raised panel 14, substructure 22, and retention structure 90 and/or support structure 92 thereof. Additionally or alternatively, it is also within the scope of the present disclosure that second gap 19 may be present in one or more region(s) of raised panel assembly 12 that do not include retention structure 90 between, or at least directly between, substructure 22 and raised panels 14. Alternatively, substructure 22 may not be present beneath gap 18, and flow-limiting structure 50 may limit a flow of sealant material 26 out of the gap. Adhesive 58 may operatively attach flow-limiting structure 50 to substructure 22 and/or raised panels 14.

Figure 7:
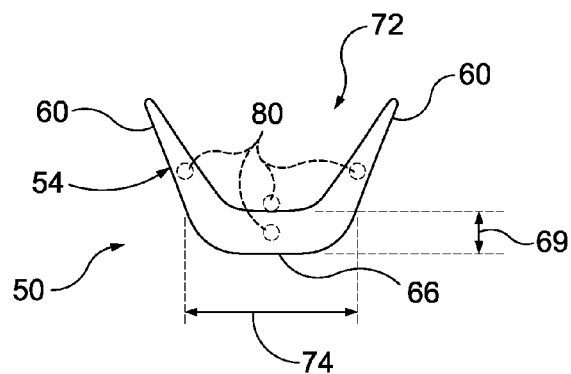
FIG. 7 is a schematic cross-sectional view of more specific but still illustrative, non-exclusive examples of a flow-limiting structure according to the present disclosure.

FIG. 7 is a schematic cross-sectional view of more specific but still illustrative, non-exclusive examples of a flow-limiting structure 50 according to the present disclosure that may include and/or be the flow-limiting structure of FIG. 1. Flow-limiting structure 50 of FIG. 7 includes a resilient elongate body 54 that defines a central portion 66 and two projections 60 that extend from the central portion to define a recessed region 72. Central portion 66 defines a central portion thickness (or average thickness) 69 and a central portion width (or average width) 74.

As illustrated in FIG. 7, projections 60 may taper away from central portion 66 and/or may taper from central portion thickness 69 to a projection thickness that is less than the central portion thickness. This may include tapering to a point, tapering to a rounded point, and/or tapering to a sharp point. It is within the scope of the present disclosure that central portion width 74 may be greater than central portion thickness 69. As illustrative, non-exclusive examples, a ratio of central portion width 74 to central portion thickness 69 may be at least 1.25, at least 1.5, at least 1.75, at least 2, at least 2.5, at least 3, at least 3.5, or at least 4.

As also illustrated in FIG. 7, flow-limiting structure 50 may include and/or be associated with an elongate disassembly aid 80. Elongate disassembly aid 80 may be located within, located at least partially within, and/or operatively attached to resilient elongate body 54 and/or central portion 66 and/or projection(s) 60 thereof prior to flow-limiting structure 50 being located within a raised panel assembly.

Figure 8:
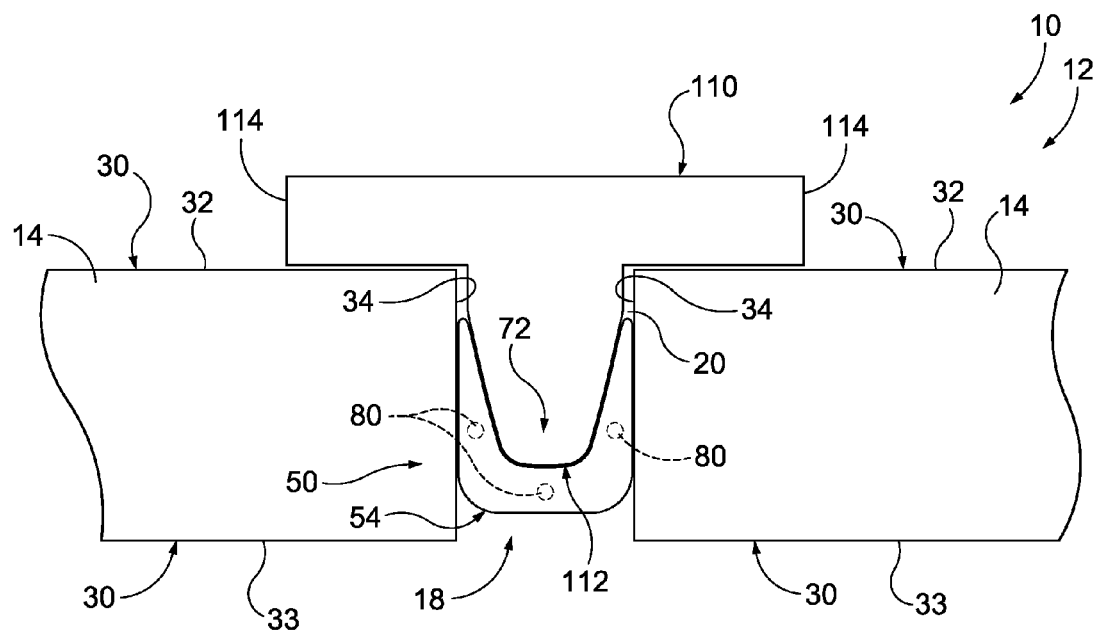
FIG. 8 is a schematic cross-sectional view of the flow-limiting structure of FIG. 7 being placed within a raised panel assembly using an application tool according to the present disclosure.
Figure 9:
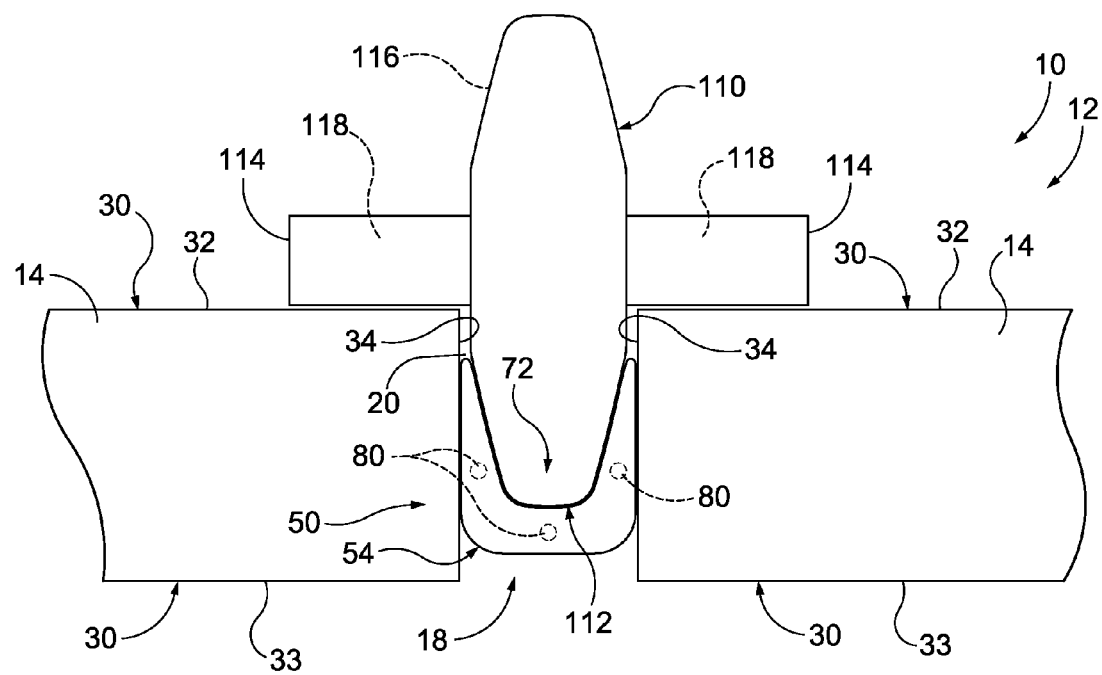
FIG. 9 is a schematic cross-sectional view of the flow-limiting structure of FIG. 7 being placed within a raised panel assembly using another application tool according to the present disclosure.

FIGS. 8-9 are schematic cross-sectional views of flow-limiting structure 50 of FIG. 7 being placed within a raised panel assembly 12 using application tools 110 according to the present disclosure. As illustrated in FIGS. 8-9, application tools 110 may include and/or define a convex region 112 that may be sized and/or shaped to be received within recessed region 72 of resilient elongate body 54. As also illustrated in FIGS. 8-9, receipt of convex region 112 of application tool 100 within recessed region 72 of flow-limiting structure 50 may permit and/or facilitate locating flow-limiting structure 50 within gap 18 with a desired, specified, and/or target orientation relative to the gap.

Application tools 110 further may include one or more depth stops 114 that may be sized to contact upper surface 32 of raised panel(s) 14 and to regulate a depth to which convex region 112 extends into gap 18. This may, in turn, regulate a depth to which flow-limiting structure 50 is inserted into gap 18 by application tools 110, thereby regulating a volume and/or cross-sectional area of channel 20 that is bounded by flow-limiting structure 50 and by edges 34 of raised panels 14. Thus, and as illustrated in FIGS. 8-10, it is within the scope of the present disclosure that application tools 110 may be configured to locate flow-limiting structure 50 at any suitable depth within gap 18.

As illustrated in FIG. 8, application tool 110 may include and/or be a monolithic application tool that is configured to slide against raised panels 14 and/or flow-limiting structure 50 when the flow-limiting structure is placed within gap 18. Additionally or alternatively, and as illustrated in FIG. 9, application tool 110 also may be defined by a plurality of components and/or may be configured to rotate relative to raised panels 14 and/or flow-limiting structure 50 when the flow-limiting structure is place within gap 18. As an illustrative, non-exclusive example, convex region 112 may be defined by a central roller 116 that is configured to rotate relative to flow-limiting structure 50. As another illustrative, non-exclusive example, depth stop(s) 114 may be defined by one or more outer rollers 118 that may be configured to rotate relative to raised panels 14. When application tool 110 includes central roller 116 and outer rollers 118, a diameter of the outer rollers may be less than a diameter of the central roller, as illustrated. This may permit flow-limiting structure 50 to be placed within gap 18 at the desired depth.

Figure 10:
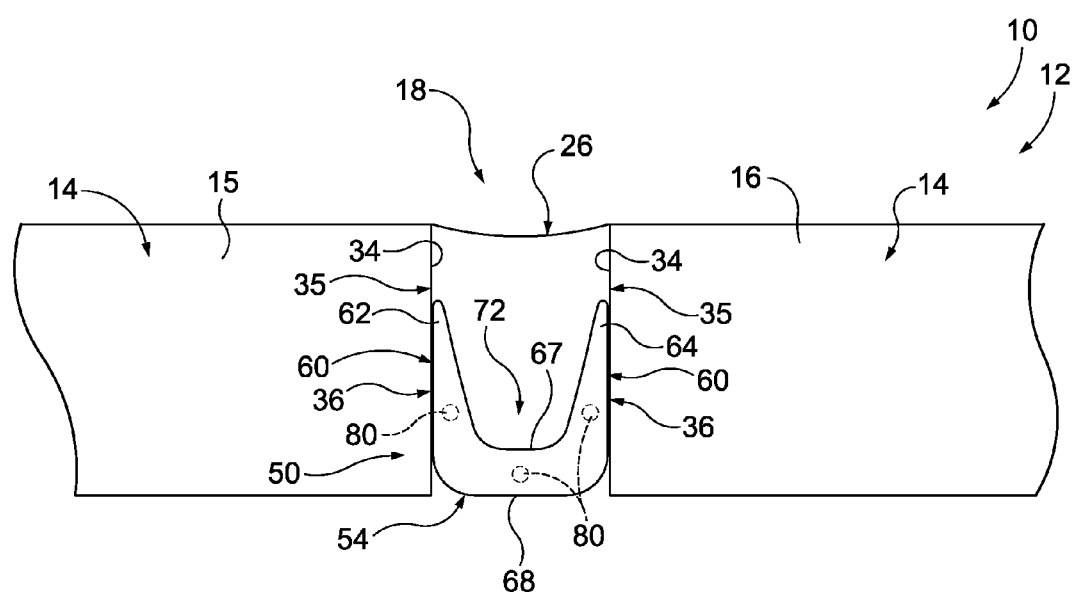
FIG. 10 is a schematic cross-sectional view of illustrative, non-exclusive examples of a raised panel assembly that includes the flow-limiting structure of FIG. 7.

FIG. 10 is a schematic cross-sectional view of illustrative, non-exclusive examples of a raised panel assembly 12 that includes flow-limiting structure 50 of FIG. 7. In FIG. 10, flow-limiting structure 50 has been placed within gap 18 to define channel 20 and sealant material 26 has been placed within channel 20 to form raised panel assembly 12. As discussed herein, sealant material 26 adheres, or directly adheres, to edges 34 of raised panels 14. In addition, sealant material 26 also is located within recessed region 72 of flow-limiting structure 50 and may be operatively attached to, directly attached to, adhered to, and/or directly adhered to the flow-limiting structure and/or to resilient elongate body 54 thereof.

As illustrated in FIG. 10, a first projection 62 is in contact with and/or forms a fluid seal with edge 34 (or a first edge 34) of a first raised panel 15. Similarly, a second projection 64 is in contact with and/or forms a fluid seal with edge 34 (or a second edge 34) of a second raised panel 16.

It is within the scope of the present disclosure that flow-limiting structure 50 and/or resilient elongate body 54 thereof may define an undeformed conformation (such as when the flow-limiting structure is not located within gap 18 and/or is not compressed between raised panels 14, as illustrated in FIG. 7) and a deformed conformation (such as when the flow-limiting structure is located within gap 18 and/or is compressed between raised panels 14, as illustrated in FIGS. 8-10). The deformed conformation may be different from the undeformed conformation.

As an illustrative, non-exclusive example, a distance (or average distance) between first projection 62 and second projection 64 when resilient elongate body 54 is in the deformed conformation may be less than a distance (or average distance) between first projection 62 and second projection 64 when resilient elongate body 54 is in the undeformed conformation. As another illustrative, non-exclusive example, resilient elongate body 54 may define a first face 67 and a second face 68; with first face 67 facing toward sealant material 26 and second face 68 being opposed to first face 67 and/or facing away from sealant material 26. When resilient elongate body 54 is in the undeformed conformation, first face 67 and/or second face 68 may be in a relaxed state, may not be in tension, and/or may not be in compression. However, when resilient elongate body 54 is in the deformed conformation, first face 67 may be in compression. In addition, and depending upon a width of second face 68 relative to gap 18, second face 68 may be in tension, may be in compression, or may be compressed by an amount (or second amount) that is less than an amount (or first amount) of compression of first face 67.

When raised panel assemblies 12 include flow-limiting structures 50 that include projections 60, the projections may be sized to contact and/or form the fluid seal with edges 34 of raised panels 14 despite variation in a width of gap 18 (as illustrated in FIG. 1 at 38) over at least a threshold width range. As illustrative, non-exclusive examples, the flow-limiting structure may be sized to contact and/or form the fluid seal with edges 34 despite gap width variations of at least 10%, at least 15%, at least 20%, at least 25%, at least 30%, at least 35%, or at least 40% of an average gap width.

In addition, projections 60 may be sized to regulate a contact area 35 between edges 34 and sealant material 26, thereby regulating an overall strength of an adhesive bond therebetween. As illustrative, non-exclusive examples, a length of projections 60 (or a contact area 36 between projections 60 and edges 34) may be decreased to increase contact area 35 between edges 34 and sealant material 26. As another illustrative, non-exclusive example, the length of projections 60 or contact area 36) may be increased to decrease contact area 35 between edges 34 and sealant material 26.

FIG. 11 is a flowchart depicting illustrative, non-exclusive examples of methods 200 according to the present disclosure of constructing a raised panel assembly. Methods 200 optionally may include locating one or more raised panels at 210 and/or orienting a flow-limiting structure relative to an application tool at 215 and include placing the flow-limiting structure into the raised panel assembly at 220 to create a channel that is configured to receive a sealant material. The methods further optionally may include placing an elongate disassembly aid within the raised panel assembly at 230 and include applying the sealant material to the channel at 240. The methods also may include occluding a flow of sealant material past the flow-limiting structure at 250, limiting contact between the sealant material and a substructure at 260, and/or curing the sealant material within the gap at 270.

Locating the one or more raised panels at 210 may include moving, orienting, and/or otherwise arranging the one or more raised panels to produce the gap between the two or more raised panels, such as between two or more edges thereof. Additionally or alternatively, the locating also may include orienting the one or more raised panels with respect to a substructure that is configured to support the one or more raised panels and/or operatively attaching the one or more raised panels to the substructure.

Orienting the flow-limiting structure relative to the application tool at 215 may include orienting such that the flow-limiting structure is placed within the raised panel assembly (such as during the placing at 220) at a desired orientation and/or location. As an illustrative, non-exclusive example, and as discussed in more detail herein, the flow-limiting structure may define a recessed region and the application tool may define a convex region that is shaped and/or sized to be received within the recessed region. Under these conditions, the orienting at 215 may include locating the convex region of the application tool within the recessed region of the flow-limiting structure. It is within the scope of the present disclosure that the application tool and/or the flow-limiting structure may be constructed and/or sized to define a single, target, preferred, and/or desired relative orientation therebetween when the convex region of the application tool is received within the recessed region of the flow-limiting structure, thereby facilitating location of the flow-limiting structure within the raised panel assembly with a target, preferred, and/or desired orientation relative to the raised panels thereof.

Placing the flow-limiting structure into the raised panel assembly at 220 may include inserting the flow-limiting structure to a desired depth, illustrative, non-exclusive examples of which are discussed in more detail herein, within the gap prior to the applying to produce a channel, trough, and/or trench that includes a portion of the gap and is configured to receive the sealant material. It is within the scope of the present disclosure that the inserting may include manually inserting and/or otherwise pressing the flow-limiting structure into the gap. However, it is also within the scope of the present disclosure that the inserting may include the use of the application tool, as discussed in more detail herein. The inserting further may include compressing the flow-limiting structure between two raised panels, such as between two edges thereof, by at least a compression percentage, illustrative, non-exclusive examples of which are discussed in more detail herein.

When the gap is located above the substructure, the inserting also may include inserting the flow-limiting structure into the gap to decrease, limit, block, and/or otherwise stop a flow of the sealant material into contact with the substructure, as shown at 260. When the gap is not located above the substructure, the inserting may include inserting the flow-limiting structure and applying the sealant material without adhering a tape material (or an additional tape material) to a side of the gap that is opposite from a side of the gap from which the applying is performed.

Additionally or alternatively, placing the flow-limiting structure into the raised panel assembly at 220 may include locating the flow-limiting structure such that it forms at least one surface and/or boundary of the channel that is configured to receive the sealant material. As an illustrative, non-exclusive example, and as discussed in more detail herein, this may include placing the flow-limiting structure between the raised panels of the raised panel assembly and the substructure that is configured to support the raised panel assembly. As another illustrative, non-exclusive example, and as also discussed in more detail herein, this may include adhering or otherwise attaching the flow-limiting structure to at least one of a support surface of the substructure and a lower surface of the raised panels.

Placing the elongate disassembly aid within the raised panel assembly at 230 may include placing the elongate disassembly aid into any suitable portion of the gap and/or within the flow-limiting structure, illustrative, non-exclusive examples of which are discussed in more detail herein. It is within the scope of the present disclosure that the placing may be performed concurrently, or at least substantially concurrently, with the inserting. However, it is also within the scope of the present disclosure that the placing may be performed prior to and/or subsequent to the inserting. When the placing is performed currently with the inserting, the elongate disassembly aid may form a portion of the flow-limiting structure or may be separate from the flow-limiting structure. When the placing is performed subsequent to the inserting, the placing may be performed prior to the applying.

Applying the sealant material at 240 may include the use of any suitable method to fill at least a portion of the channel with sealant material. It is within the scope of the present disclosure that, as discussed in more detail herein, the applying may include applying the sealant material in a liquid, or at least substantially liquid, form and curing the sealant material within the channel to produce a solid, or at least substantially solid, sealant material as illustrated at 270. As also discussed in more detail herein, the applying and/or the curing may include forming an adhesive bond between the sealant material and the raised panels that are in contact therewith and/or between the sealant material and the flow-limiting structure. During and/or subsequent to the applying, the flow-limiting structure may occlude, limit, and/or block a flow of the sealant material therepast, as illustrated at 250.

FIG. 12 is a flowchart depicting illustrative, non-exclusive examples of methods 300 of disassembling a raised panel assembly that includes an elongate disassembly aid according to the present disclosure. The methods include grasping the elongate disassembly aid at 310 and removing the elongate disassembly aid from the raised panel assembly at 320. The methods also may include separating the elongate disassembly aid from a flow-limiting structure at 330 and include severing a portion of a sealant material at 340. The methods further may include removing a removed panel from the raised panel assembly at 350, replacing the removed panel with a replacement panel at 360, and/or sealing the replacement panel at 370.

Grasping the elongate disassembly aid at 310 may include the use of any suitable system and/or method to retain, hold, and/or otherwise grasp at least a portion of the elongate disassembly aid to facilitate removal of the elongate disassembly aid from the raised panel assembly. It is within the scope of the present disclosure that the grasping may include separating a portion of the elongate disassembly aid from the raised panel assembly and/or that the grasping may include grasping the elongate disassembly aid while it is within the raised panel assembly.

Removing the elongate disassembly aid from the raised panel assembly at 320 may include drawing and/or otherwise pulling the elongate disassembly aid through the sealant material to sever at least a severed portion of the sealant material that extends between the raised panels, as illustrated at 340. Illustrative, non-exclusive examples of the severed portion of the sealant material are discussed in more detail herein.

When the elongate disassembly aid forms a portion of and/or is operatively attached to a flow-limiting structure, the removing also may include separating the elongate disassembly aid from the flow-limiting structure, as illustrated at 330. This may include slicing, cutting, severing, tearing, and/or splitting at least a portion of the flow-limiting structure during the separating.

Removing the raised panel from the raised panel assembly at 350 may include separating the raised panel from the raised panel assembly to access structure that may be present beneath the raised panel and/or to repair, rework, and/or replace the raised panel. Replacing the removed raised panel at 360 may include replacing the removed raised panel with any suitable raised panel, illustrative, non-exclusive examples of which include a new raised panel, a repaired raised panel, a reworked raised panel, and/or the removed raised panel. Sealing the replacement panel at 370 may include the use of any suitable system and/or method, including methods 200, to seal the edges of the replacement panel.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A flow-limiting structure that is configured to limit a flow of a sealant material out of a gap between adjacent raised panels, the flow-limiting structure comprising:

a resilient elongate body, wherein the resilient elongate body defines a longitudinal axis.

A2. The flow-limiting structure of paragraph A1, wherein the flow-limiting structure at least one of includes and is proximal to a means to sever the sealant material that is between the adjacent raised panels.

A3. The flow-limiting structure of paragraph A2, wherein the means to sever the sealant material that is between the adjacent raised panels includes an elongate disassembly aid, and optionally wherein a longitudinal axis of the elongate disassembly aid is coextensive with the longitudinal axis of the resilient elongate body.

A4. The flow-limiting structure of any of paragraphs A1-A3, wherein the resilient elongate body is formed from at least one of a resilient solid, an elastomer, a polymer, a hydrophobic material, a foam, a hydrophobic foam, a polyurethane foam, and a hydrophobic polyurethane foam.

A5. The flow-limiting structure of any of paragraphs A1-A4, wherein the resilient elongate body is configured to be placed within the raised panel assembly as a solid.

A6. The flow-limiting structure of any of paragraphs A1-A5, wherein the resilient elongate body includes a substantially constant transverse cross-sectional shape, and optionally wherein the transverse cross-sectional shape includes at least one of a circular, an oval, an ellipsoidal, a trapezoidal, a polygonal, a square, and a rectangular transverse cross-sectional shape.

A7. The flow-limiting structure of any of paragraphs A1-A6, wherein the resilient elongate body is configured to be inserted within the gap and to be compressed upon insertion into the gap, wherein the resilient elongate body includes a characteristic transverse cross-sectional diameter when in an uncompressed state, and further wherein the characteristic transverse cross-sectional diameter is greater than a width of the gap, and optionally wherein the characteristic transverse cross-sectional diameter is at least 5%, at least 10%, at least 15%, at least 20%, at least 25%, at least 30%, at least 35%, at least 40%, at least 45%, at least 50%, 5-25%, or 5-50% greater than the width of the gap.

A8. The flow-limiting structure of any of paragraphs A3-A7, wherein the elongate disassembly aid includes at least one of a string, a thread, a filament, a wire, a rod, and a cable.

A9. The flow-limiting structure of any of paragraphs A3-A8, wherein the elongate disassembly aid is formed from at least one of a metal, a polymer, an elastomer, nylon, polyester, polyethylene, polypropylene, and a hydrophobic material.

A10. The flow-limiting structure of any of paragraphs A3-A9, wherein the elongate disassembly aid includes at least one of a different chemical composition, a different density, a different Young's modulus, a different shear strength, and a different tensile strength than the resilient elongate body, and optionally wherein the elongate disassembly aid includes at least one of a greater shear strength and a greater tensile strength than the resilient elongate body.

A11. The flow-limiting structure of any of paragraphs A3-A10, wherein the elongate disassembly aid is at least one of located within and operatively attached to the resilient elongate body.

A12. The flow-limiting structure of paragraph A11, wherein the elongate disassembly aid is configured to be separated from the resilient elongate body and to at least one of slice, cut, sever, tear, and split at least a portion of the sealant material from between the adjacent raised panels.

A13. The flow-limiting structure of any of paragraphs A11-A12, wherein the elongate disassembly aid is configured to modify a structure of the resilient elongate body upon separation from the resilient elongate body, and optionally wherein the elongate disassembly aid is configured to at least one of slice, cut, sever, tear, and split the resilient elongate body upon separation from the resilient elongate body.

A14. The flow-limiting structure of paragraph A13, wherein the elongate disassembly aid is configured to modify at least a portion of a length of the resilient elongate body upon separation from the resilient elongate body, optionally wherein the portion of the length of the resilient elongate body includes at least 50%, at least 60%, at least 70%, at least 75%, at least 80%, at least 90%, at least 95%, at least 99%, 100%, 50-100%, 70-99%, or 75-100% of the length of the resilient elongate body, and further optionally wherein the length of the resilient elongate body is coextensive with the longitudinal axis of the resilient elongate body.

A15. The flow-limiting structure of any of paragraphs A3-A11, wherein the elongate disassembly aid is located within the sealant material, optionally wherein the elongate disassembly aid is surrounded by the sealant material, and further optionally wherein the elongate disassembly aid is not surrounded by the resilient elongate body.

A16. The flow-limiting structure of any of paragraphs A3-A11, wherein the elongate disassembly aid is between the sealant material and the resilient elongate body.

A17. The flow-limiting structure of any of paragraphs A15-A16, wherein the elongate disassembly aid is configured to be separated from the sealant material and to at least one of slice, cut, sever, tear, and split at least a portion of the sealant material from between the adjacent raised panels, and optionally wherein the elongate disassembly aid is configured to be separated from the sealant material without damage to the resilient elongate body.

A18. The flow-limiting structure of any of paragraphs A1-A17, wherein at least a portion of the flow-limiting structure is configured to be adhered to at least one of a support surface of a substructure that is configured to support the raised panels and a lower surface of the raised panels.

A19. The flow-limiting structure of any of paragraphs A1-A17, wherein at least a portion of the flow-limiting structure is configured to be secured to at least one of a support surface of a substructure that is configured to support the raised panels and a lower surface of the raised panels.

A20. The flow-limiting structure of any of paragraphs A1-A19, wherein the flow-limiting structure is configured to form at least one boundary of a channel that is configured to receive the sealant material.

A21. The flow-limiting structure of any of paragraphs A1-A20, wherein the resilient elongate body defines a central portion and two projections that extend from the central portion, optionally when viewed in transverse cross section.

A22. The flow-limiting structure of paragraph A21, wherein the two projections extend from opposed sides, opposed regions, and/or opposed side regions of the central portion.

A23. The flow-limiting structure of any of paragraphs A21-A22, wherein the central portion and the two projections extend along the longitudinal axis of the resilient elongate body.

A24. The flow-limiting structure of any of paragraphs A21-A23, wherein the central portion defines a central portion thickness (or average thickness), and further wherein the two projections taper from the central portion thickness (or average thickness) to a projection thickness that is less than the central portion thickness (or average thickness).

A25. The flow-limiting structure of any of paragraphs A21-A24, wherein the two projections taper away from the central portion when viewed in transverse cross section, optionally wherein the two projections taper to at least one of a point, a rounded point, and a sharp point.

A26. The flow-limiting structure of any of paragraphs A21-A25, wherein the central portion defines a/the central portion thickness (or average thickness) and a central portion width (when viewed in transverse cross section), and further wherein the central portion width is greater than the central portion thickness (or average thickness), and optionally wherein a ratio of the central portion width to the central portion thickness (or the average central portion thickness) is at least 1.25, at least 1.5, at least 1.75, at least 2, at least 2.5, at least 3, at least 3.5, or at least 4.

A27. The flow-limiting structure of any of paragraphs A21-A26, wherein the central portion defines a first face and a second face that is opposed to the first face, and optionally wherein the first face and the second face define a/the central portion thickness (or average thickness).

A28. The flow-limiting structure of paragraph A27, wherein the two projections extend from respective edges of the central portion, wherein the respective edges of the central portion are defined between the first face and the second face.

A28. The flow-limiting structure of paragraph A27, wherein the two projections extend from one of the first face and the second face.

A29. The flow-limiting structure of any of paragraphs A21-A26, wherein the two projections extend from the central portion to define a recessed region therebetween, optionally wherein the recessed region is at least one of a concave region, a generally V-shaped region, a generally U-shaped region, a generally cup-shaped region, and a generally trough-shaped region, optionally when viewed in transverse cross section.

A30. The flow-limiting structure of paragraph A29, wherein the recessed region is configured to receive a/the sealant material.

A31. The flow-limiting structure of any of paragraphs A21-A30, wherein an/the elongate disassembly aid is at least one of located within, located at least partially within, and operatively attached to at least one of (i) the central portion and (ii) one of the two projections.

A32. The flow-limiting structure of any of paragraphs A21-A31, wherein the resilient elongate body is a monolithic resilient elongate body that defines the central portion and the two projections.

B1. A kit of components configured to be utilized to seal a gap between adjacent raised panels, the kit comprising:
the flow-limiting structure of any of paragraphs A1-A32; and
a sealant material, wherein the flow-limiting structure is configured to form at least one boundary of a channel that forms a portion of the gap and is configured to receive the sealant material, wherein the flow-limiting structure is configured to limit a flow of the sealant material therepast, and further wherein the sealant material is configured be applied to the channel, to fill a portion of the channel, and to adhere to each of the adjacent raised panels.

B2. The kit of paragraph B1, wherein the flow-limiting structure is configured to be placed within the gap, and the kit further includes an application tool that is configured to insert the flow-limiting structure to a desired depth within the gap prior to the application of the sealant material.

B3. The kit of paragraph B2, wherein the desired depth includes a depth at which a contact area between the sealant material and the adjacent raised panels is sufficient to provide a desired bond strength therebetween.

B4. The kit of any of paragraphs B2-B3, wherein the sealant material is configured to be applied to the gap as a liquid and to be cured within the gap to form a solid.

B5. The kit of any of paragraphs B1-B4, wherein the application tool defines a convex region that is shaped to be received within a/the recessed region that is defined by the resilient elongate body, optionally wherein the recessed region is defined by a/the central portion and two projections that are defined by the resilient elongate body.

B6. The kit of paragraph B5, wherein, when the convex region is received within the recessed region and the flow-limiting structure is located within the gap by the application tool, the flow-limiting structure defines a desired orientation relative to the gap.

B7. The kit of any of paragraphs B5-B6, wherein the recessed region and the convex region are sized to preferentially locate the flow-limiting structure within the gap with a/the desired orientation relative to the gap.

B8. The kit of any of paragraphs B5-B7, wherein the application tool includes a central roller that defines the convex region and at least one depth stop that is configured to contact an upper surface of one of the adjacent raised panels to regulate a depth of the flow-limiting structure within the gap, optionally wherein the at least one depth stop includes, or is, at least one outer roller, and further optionally wherein a diameter of the at least one outer roller is less than a diameter of the central roller.

C1. A raised panel assembly comprising:
a first raised panel, wherein the first raised panel includes two substantially opposed first surfaces and a first edge;
a second raised panel, wherein the second raised panel includes two substantially opposed second surfaces and a second edge, and further wherein a first adjacent portion of the first edge is opposed to and spaced apart from a second adjacent portion of the second edge to form a gap between the first raised panel and the second raised panel;
a flow-limiting structure, wherein the flow-limiting structure defines at least one boundary of a channel that includes at least a portion of the gap; and
a sealant material, wherein the sealant material is located within the channel, wherein the sealant material is configured to form an adhesive bond with the first adjacent portion and the second adjacent portion, and further wherein the flow-limiting structure is configured to limit, and optionally block, a flow of the sealant material therepast.

C2. The raised panel assembly of paragraph C1, wherein the flow-limiting structure is in mechanical contact with the first adjacent portion and the second adjacent portion.

C3. The raised panel assembly of any of paragraphs C1-C2, wherein the flow-limiting structure includes the flow-limiting structure of any of paragraphs A1-A32.

C4. The raised panel assembly of any of paragraphs C1-C3, wherein the sealant material includes at least one of an adhesive, an elastomer, a polymer, a resilient material, and a hydrophobic material.

C5. The raised panel assembly of any of paragraphs C1-C4, wherein the sealant material is configured to be applied to the gap as a liquid and to cure within the gap to form a solid.

C6. The raised panel assembly of any of paragraphs C1-C5, wherein the raised panel assembly at least one of further includes and is in mechanical communication with a substructure, and further wherein at least a portion of the raised panel assembly is operatively attached to the substructure.

C7. The raised panel assembly of paragraph C6, wherein the substructure includes a support surface, and further wherein the first adjacent portion, the second adjacent portion, and the gap are located on the support surface.

C8. The raised panel assembly of paragraph C7, wherein the flow-limiting structure is located between the sealant material and the support surface and is configured to limit, and optionally block, contact between the sealant material and the support surface.

C9. The raised panel assembly of any of paragraphs C7-C8, wherein the raised panel assembly further includes a plurality of retention structures that are configured to operatively attach at least one of the first raised panel and the second raised panel to the substructure.

C10. The raised panel assembly of paragraph C9, wherein the plurality of retention structures includes at least one of a fastener, a screw, a rivet, a bolt, a washer, a nut, and a nut clip.

C11. The raised panel assembly of any of paragraphs C9-C10, wherein the gap is a first gap, wherein the plurality of retention structures includes a plurality of support structures, wherein the plurality of support structures are between the support surface and at least one of the first raised panel and the second raised panel, and further wherein the plurality of support structures produce a second gap between the support surface and at least one of the first raised panel and the second raised panel.

C12. The raised panel assembly of paragraph C11, wherein the flow-limiting structure is configured to limit, and optionally block, a flow of the sealant material into the second gap.

C13. The raised panel assembly of any of paragraphs C7-C12, wherein the flow-limiting structure is located between the first raised panel and the support surface and between the second raised panel and the support surface.

C14. The raised panel assembly of paragraph C13, wherein the flow-limiting structure is operatively attached, and optionally adhered, to at least one of the support surface, a lower surface of the first raised panel, and a lower surface of the second raised panel.

C15. The raised panel assembly of paragraph C6, wherein the substructure includes a support surface, and further wherein the first adjacent portion, the second adjacent portion, and the gap are not located on the support surface.

C16. The raised panel assembly of paragraph C15, wherein the gap does not include a tape material on a side of the gap that is opposite from a side of the gap from which the sealant material is applied to the gap.

C17. The raised panel assembly of paragraph C15, wherein the flow-limiting structure is operatively attached, and optionally adhered, to at least one of a lower surface of the first raised panel and a lower surface of the second raised panel, and optionally wherein the flow-limiting structure includes at least one of a tape and a foam tape.

C18. The raised panel assembly of any of paragraphs C1-C17, wherein the gap includes a width, and further wherein the width is at least one of less than 2 cm, less than 1.5 cm, less than 1 cm, less than 0.75 cm, less than 0.5 cm, less than 0.4 cm, less than 0.3 cm, less than 0.2 cm, less than 0.1 cm, 0.1-2 cm, 0.1-1 cm, and 0.2-0.8 cm.

C19. The raised panel assembly of any of paragraphs C1-C18, wherein the gap includes a depth, and further wherein the depth is at least one of less than 2.5 cm, less than 2 cm, less than 1.5 cm, less than 1 cm, less than 0.75 cm, less than 0.5, and 0.5-2.5 cm.

C20. The raised panel assembly of any of paragraphs C1-C19, wherein the sealant material includes a sealant material volume, and further wherein the sealant material volume is less than a sealant material volume for a comparable raised panel assembly that includes the first raised panel, the second raised panel, and the sealant material but does not include the flow-limiting structure, and optionally wherein the sealant material volume is at least one of 10%, 20%, 25%, 30%, 40%, 50%, 60%, 70%, and 75% less than the sealant material volume for the comparable raised panel assembly.

C21. The raised panel assembly of any of paragraphs C1-C20, wherein at least one of the first raised panel and the second raised panel includes a composite panel, wherein the composite panel includes a first surface material that comprises a first surface of the composite panel, a second surface material that comprises a second, opposed, surface of the composite panel, and a core material that is between the first surface material and the second surface material.

C22. The raised panel assembly of paragraph C21, wherein at least one, and optionally both, of the first adjacent portion and the second adjacent portion includes a potted edge with a potting material that covers the core material.

C23. The raised panel assembly of any of paragraphs C21-C22, wherein at least one, and optionally both, of the first adjacent portion and the second adjacent portion includes an unpotted edge with exposed core material.

C24. The raised panel assembly of any of paragraphs C1-C23, wherein at least an unsupported portion of at least one of the first raised panel and the second raised panel includes an unsupported region, and optionally wherein the unsupported portion includes at least 25%, at least 50%, at least 60%, at least 65%, at least 70%, at least 75%, at least 80%, at least 85%, at least 90%, at least 95%, 50-95%, 70-95%, or 75-90% of a surface area of the at least one of the first raised panel and the second raised panel.

C25. The raised panel assembly of any of paragraphs C1-C24, wherein the raised panel assembly forms a portion of at least one of a raised floor, a ceiling, and a wall.

C26. The raised panel assembly of any of paragraphs C1-C25, wherein the flow-limiting structure is located within the gap.

C27. The raised panel assembly of any of paragraphs C1-C26 when dependent from any of paragraphs A21-A32, wherein the two projections include a first projection and a second projection.

C28. The raised panel assembly of paragraph C27, wherein the first projection is in contact with the first edge, and further wherein the second projection is in contact with the second edge.

C29. The raised panel assembly of any of paragraphs C27-C28, wherein the first projection forms a fluid seal with the first edge, and further wherein the second projection forms a fluid seal with the second edge.

C30. The raised panel assembly of any of paragraphs C27-C29, wherein the sealant material is operatively attached, directly attached, adhered, and/or directly adhered to the resilient elongate body.

C31. The raised panel assembly of any of paragraphs C27-C30, wherein the sealant material is located within a/the recessed region that is defined by the resilient elongate body.

C32. The raised panel assembly of any of paragraphs C27-C31, wherein the resilient elongate body defines an undeformed conformation prior to being located within the gap and a deformed conformation subsequent to being located within the gap, optionally wherein the deformed conformation is different from the undeformed conformation.

C33. The raised panel assembly of paragraph C32, wherein an average distance between the first projection and the second projection when the resilient elongate body is in the deformed conformation is less than an average distance between the first projection and the second projection when the resilient elongate body is in the undeformed conformation.

C34. The raised panel assembly of any of paragraphs C1-C33, wherein the resilient elongate body defines a/the first face that is directed toward the sealant material and a/the second face that is opposed to the first face and directed away from the sealant material.

C35. The raised panel assembly of paragraph C34, wherein the first face is in compression and the second face is in tension.

C36. The raised panel assembly of paragraph C34, wherein the first face is compressed by a first amount, and further wherein the second face is compressed by a second amount that is less than the first amount.

C37. A building including the raised panel assembly of any of paragraphs C1-C36.

C38. An aircraft including the raised panel assembly of any of paragraphs C1-C36.

C39. An automobile including the raised panel assembly of any of paragraphs C1-C36.

C40. A structure including the raised panel assembly of any of paragraphs C1-C36.

C41. A machine including the raised panel assembly of any of paragraphs C1-C36.

D1. A method of constructing a raised panel assembly, the method comprising:

placing a flow-limiting structure within the raised panel assembly to form a boundary of a channel that is configured to receive a sealant material, wherein the channel includes a portion of a gap between a first edge of a first raised panel and a second edge of a second raised panel; and applying the sealant material to the channel, wherein the flow-limiting structure limits, and optionally blocks, a flow of the sealant material therepast, wherein the sealant material forms an adhesive bond with the first raised panel and the second raised panel, and further wherein the applying is performed after the placing.

D2. The method of paragraph D1, wherein the method further includes locating the raised panels to produce the gap.

D3. The method of any of paragraphs D1-D2, wherein the gap is located above a support surface of a substructure, and further wherein the placing includes placing the flow-limiting structure to limit a flow of the sealant material into contact with the substructure.

D4. The method of any of paragraphs D1-D3, wherein the method further includes placing an elongate disassembly aid within the gap, wherein the elongate disassembly aid is configured to decrease a time needed to disassemble the first raised panel from the second raised panel by at least one of slicing, cutting, severing, tearing, and splitting at least a portion of the sealant material that extends between the first raised panel and the second raised panel.

D5. The method of paragraph D4, wherein the placing the elongate disassembly aid is performed concurrently with the placing the flow-limiting structure, and optionally wherein the elongate disassembly aid forms a portion of the flow-limiting structure.

D6. The method of paragraph D4, wherein the placing the elongate disassembly aid is performed subsequent to the placing the flow-limiting structure, and optionally wherein the placing the elongate disassembly aid is performed prior to the applying.

D7. The method of any of paragraphs D1-D6, wherein the placing the flow-limiting structure includes placing the flow-limiting structure into the gap.

D8. The method of paragraph D7, wherein the method includes placing the flow-limiting structure and applying the sealant material without adhering a separate tape material to a side of the gap that is opposite from a side of the gap from which the applying is performed.

D9. The method of any of paragraphs D7-D8, wherein the placing the flow-limiting structure includes placing the flow-limiting structure to a desired depth with an application tool, and optionally wherein the desired depth includes a depth at which a contact area between the sealant material, the first raised panel, and the second raised panel is sufficient to provide a desired bond strength therebetween.

D10. The method of paragraph D9, wherein the method further includes orienting the flow-limiting structure relative to the application tool, optionally prior to the placing.

D11. The method of paragraph D10, wherein the orienting includes locating a convex region of the application tool within a recessed region that is defined by the flow-limiting structure.

D12. The method of any of paragraphs D7-D1, wherein the placing the flow-limiting structure includes compressing the flow-limiting structure between the first edge and the second edge, and optionally wherein the compressing includes compressing the flow-limiting structure in at least one dimension by at least 5%, at least 10%, at least 15%, at least 20%, at least 25%, at least 30%, at least 35%, at least 40%, at least 45%, at least 50%, 5-25%, or 5-50%.

D13. The method of any of paragraphs D1-D12, wherein the placing the flow-limiting structure includes operatively attaching, and optionally adhering, the flow-limiting structure to a lower surface of the first raised panel and a lower surface of the second raised panel.

D14. The method of any of paragraphs D1-D13, wherein the placing the flow-limiting structure includes placing the flow-limiting structure between the first raised panel and a/the substructure and placing the flow-limiting structure between the second raised panel and a/the substructure.

D15. The method of paragraph D14, wherein the placing further includes operatively attaching, and optionally adhering, the flow-limiting structure to the substructure.

D16. The method of any of any of paragraphs D1-D15, wherein the applying includes applying the sealant material as a liquid sealant material, and further wherein the method includes curing the sealant material to form a solid sealant material.

D17. The method of any of paragraphs D1-D16, wherein the method further includes occluding a flow of the sealant material past the flow-limiting structure, and optionally wherein the occluding includes blocking.

D18. The method of any of paragraphs D1-D17, wherein the flow-limiting structure includes the flow-limiting structure of any of paragraphs A1-A32.

D19. The method of any of paragraphs D1-D18, wherein the method is performed using the kit of any of paragraphs B1-B8.

D20. The method of any of paragraphs D1-D19, wherein the raised panel assembly includes the raised panel assembly of any of paragraphs C1-C41.

E1. A method of disassembling a raised panel assembly, wherein the raised panel assembly includes a first raised panel with a first edge, a second raised panel with a second edge, and a gap between the first edge and the second edge, wherein a flow-limiting structure defines at least one boundary of a channel that includes a portion of the gap, wherein the channel contains a sealant material, and further wherein at least one of the sealant material and the flow-limiting structure includes an elongate disassembly aid, the method comprising:

grasping the elongate disassembly aid;

removing the elongate disassembly aid from the raised panel assembly; and severing at least a severed portion of the sealant material that extends between the first edge and the second edge with the elongate disassembly aid during the removing.

E2. The method of paragraph E1, wherein the severed portion of the sealant material includes at least 50% of the sealant material that extends between the first edge and the second edge, optionally including at least 60%, at least 70%, at least 80%, at least 90%, at least 99%, or 100% of the sealant material that extends between the first edge and the second edge.

E3. The method of any of paragraphs E1-E2, wherein the removing includes separating the elongate disassembly aid from the flow-limiting structure, and optionally wherein the separating includes separating the elongate disassembly aid from at least one of an outer surface of the flow-limiting structure and an internal region of the flow-limiting structure.

E4. The method of paragraph E3, wherein the separating includes at least one of slicing, cutting, severing, tearing, and splitting at least a portion of the flow-limiting structure.

E5. The method of any of paragraphs E1-E4, wherein the method further includes removing a removed panel from the raised panel assembly, wherein the removed panel includes at least one of the first raised panel and the second raised panel.

E6. The method of paragraph E5, wherein the method further includes replacing the removed panel with a replacement panel.

E7. The method of paragraph E6, wherein the replacing includes replacing the removed panel using the kit of any of paragraphs B1-B8.

E8. The method of paragraph E6, wherein the replacing includes replacing the removed panel using the method of any of paragraphs D1-D20.

E9. The method of any of paragraphs E1-E8, wherein the flow-limiting structure includes the flow-limiting structure of any of paragraphs A1-A32.

E10. The method of any of paragraphs E1-E9, wherein the raised panel assembly includes the raised panel assembly of any of paragraphs C1-C41.

F1. The use of the flow-limiting structure of any of paragraphs A1-A32, the kit of any of paragraphs B1-B8, or the raised panel assembly of any of paragraphs C1-C41 with the methods of any of paragraphs D1-E10.

F2. The use of the methods of any of paragraphs D1-E10 with the flow-limiting structure of any of paragraphs A1-A32, the kit of any of paragraphs B1-B8, or the raised panel assembly of any of paragraphs C1-C41.

F3. The use of a flow-limiting structure to limit, and optionally block, a flow of a sealant material during construction of a raised panel assembly.

F4. The use of a flow-limiting structure with included elongate disassembly aid during removal of a raised panel from a raised panel assembly.

F5. The use of an application tool to control a depth of insertion of a flow-limiting structure into a gap between adjacent raised panels during construction of a raised panel assembly.

INDUSTRIAL APPLICABILITY

The systems and methods disclosed herein are applicable to the aviation industry, as well as to other industries that may utilize raised panel assemblies.

It is believed that the disclosure set forth above encompasses multiple distinct embodiments with independent utility. While each of these embodiments has been disclosed in its preferred form, the specific examples thereof, as disclosed and illustrated herein, are not to be considered in a limiting sense as numerous variations are possible. The subject matter of the described embodiments includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one or more of the disclosed embodiments and are novel and non-obvious. Other combinations and subcombinations of features, functions, elements and/or properties may be claimed through amendment of the present claims or presentation of new claims in this or a related application. Such amended or new claims, whether they are directed to a different or the same embodiment, whether different, broader, narrower, or equal in scope to the original claims, are also regarded as included within the subject matter of the present disclosure.

The invention claimed is:

1. A method of constructing a raised panel assembly, the method comprising:
   locating a first raised panel and a second raised panel within an aircraft to produce a gap between a first edge of the first raised panel and a second edge of the second raised panel, wherein at least one of the first raised panel and the second raised panel is a composite panel, wherein the composite panel includes a first surface material that comprises a first surface of the composite panel, a second surface material that comprises a second, opposed, surface of the composite panel, and a core material that extends between the first surface material and the second surface material;
   placing a flow-limiting structure within the raised panel assembly to form a boundary of a channel that is configured to receive a sealant material, wherein the channel includes a portion of the gap;
   placing an elongate disassembly aid within the gap, wherein the elongate disassembly aid is configured to decrease a time needed to disassemble the first raised panel from the second raised panel by at least one of slicing, cutting, severing, tearing, and splitting at least a portion of the sealant material that extends between the first raised panel and the second raised panel; and
   applying the sealant material to the channel, wherein the flow-limiting structure limits a flow of the sealant material therepast, wherein the sealant material forms an adhesive bond with the first raised panel and the second raised panel, and further wherein the applying is performed after the placing.

2. The method of claim 1, wherein the elongate disassembly aid forms a portion of the flow-limiting structure, and further wherein the placing the elongate disassembly aid is performed concurrently with the placing the flow-limiting structure.

3. The method of claim 1, wherein the placing the elongate disassembly aid is performed subsequent to the placing the flow-limiting structure.

4. The method of claim 1, wherein the method includes placing the flow-limiting structure and applying the sealant material without adhering a separate tape material to a side of the gap that is opposite from a side of the gap from which the applying is performed.

5. The method of claim 1, wherein the applying includes applying the sealant material as a liquid sealant material, and further wherein the method includes curing the sealant material to form a solid sealant material.

6. The method of claim 1, wherein the placing includes placing the flow-limiting structure within the raised panel assembly as a solid.

7. The method of claim 1, wherein the placing includes compressing the flow-limiting structure between the first edge and the second edge.

8. The method of claim 1, wherein the placing includes directly contacting the flow-limiting structure with the first edge and with the second edge.

9. The method of claim 1, wherein the applying includes forming an adhesive bond between the sealant material and the flow-limiting structure.

10. The method of claim 1, wherein the placing the flow-limiting structure includes regulating a depth of the flow-limiting structure within the gap to provide a contact area between the sealant material, the first raised panel, and the second raised panel.

11. The method of claim 1, wherein the placing the flow-limiting structure includes placing the flow-limiting structure to a desired depth within the gap using an application tool.

12. The method of claim 11, wherein the method further includes orienting the flow-limiting structure relative to the application tool by locating a convex region of the application tool within a recessed region that is defined by the flow-limiting structure.

* * * * *